(12) United States Patent
Cho et al.

(10) Patent No.: US 9,469,528 B2
(45) Date of Patent: *Oct. 18, 2016

(54) ADHESIVE COMPOSITION, ADHESIVE FILM INCLUDING THE SAME, METHOD OF PREPARING ADHESIVE FILM, AND DISPLAY MEMBER USING THE SAME

(71) Applicants: Ik Hwan Cho, Uiwang-si, Gyeonggi-do (KR); In Cheon Han, Uiwang-si, Gyeonggi-do (KR)

(72) Inventors: Ik Hwan Cho, Uiwang-si, Gyeonggi-do (KR); In Cheon Han, Uiwang-si, Gyeonggi-do (KR)

(73) Assignee: CHEIL INDUSTRIES, INC., Gumi-Si, Kyeongsangbuk-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/175,358

(22) Filed: Feb. 7, 2014

(65) Prior Publication Data

US 2014/0162057 A1   Jun. 12, 2014

Related U.S. Application Data

(63) Continuation-in-part of application No. 13/571,609, filed on Aug. 10, 2012, now Pat. No. 8,945,705.

(30) Foreign Application Priority Data

Aug. 11, 2011   (KR) .................... 10-2011-0080306

(51) Int. Cl.
| | | |
|---|---|---|
| C09K 19/00 | (2006.01) | |
| B32B 17/10 | (2006.01) | |
| B32B 27/32 | (2006.01) | |
| B32B 15/08 | (2006.01) | |
| B82Y 20/00 | (2011.01) | |
| C08F 220/18 | (2006.01) | |
| C09J 133/08 | (2006.01) | |
| G02B 5/30 | (2006.01) | |
| G06F 3/041 | (2006.01) | |
| C09J 4/06 | (2006.01) | |
| G06F 3/044 | (2006.01) | |
| C08F 222/10 | (2006.01) | |

(52) U.S. Cl.
CPC .............. B82Y 20/00 (2013.01); C08F 220/18 (2013.01); C09J 4/06 (2013.01); C09J 133/08 (2013.01); G02B 5/3033 (2013.01); G06F 3/041 (2013.01); G06F 3/044 (2013.01); C08F 2222/1013 (2013.01); G02F 2202/28 (2013.01); G06F 2203/04103 (2013.01); Y10T 428/269 (2015.01); Y10T 428/31699 (2015.04); Y10T 428/31938 (2015.04)

(58) Field of Classification Search
None
See application file for complete search history.

(56) References Cited

U.S. PATENT DOCUMENTS

| | | | |
|---|---|---|---|
| 8,945,705 B2* | 2/2015 | Cho | ................. C09J 133/08 428/220 |
| 2008/0085417 A1 | 4/2008 | Takeko et al. | |
| 2008/0118752 A1 | 5/2008 | Inoue et al. | |
| 2009/0087650 A1 | 4/2009 | Inoue et al. | |
| 2010/0097344 A1* | 4/2010 | Verweg | ............ 345/174 |
| 2010/0215955 A1 | 8/2010 | Kishioka | |
| 2010/0309150 A1* | 12/2010 | Lee et al. | ............ 345/173 |
| 2011/0063244 A1 | 3/2011 | Hu et al. | |
| 2011/0195561 A1 | 8/2011 | Maeda et al. | |
| 2011/0206927 A1 | 8/2011 | Nishida et al. | |

FOREIGN PATENT DOCUMENTS

| | | |
|---|---|---|
| KR | 2011-0039476 A | 4/2011 |
| TW | 200831625 A | 8/2008 |
| TW | 201038705 A1 | 11/2010 |

OTHER PUBLICATIONS

Taiwanese Office Action dated Feb. 20, 2014.

* cited by examiner

Primary Examiner — David Sample
Assistant Examiner — Nicole T Gugliotta
(74) Attorney, Agent, or Firm — Lee & Morse, P.C.

(57) ABSTRACT

A display member includes a display panel, a first adhesive film on the display panel a transparent conductive layer on the first adhesive film, and a second adhesive film and a window on the second adhesive film. At least one of the first adhesive film and the second adhesive film includes a UV curable adhesive composition including a morpholine group-containing (meth)acrylic copolymer.

12 Claims, 5 Drawing Sheets

ADHESIVE COMPOSITION, ADHESIVE FILM INCLUDING THE SAME, METHOD OF PREPARING ADHESIVE FILM, AND DISPLAY MEMBER USING THE SAME

CROSS-REFERENCE TO RELATED APPLICATION

This application is a continuation-in-part of pending U.S. application Ser. No. 13/571,609, filed Aug. 10, 2012.

This application claims priority under 35 U.S.C. §119 to Korean Patent Application No. 10-2011-0080306, filed on Aug. 11, 2011, in the Korean Intellectual Property Office, and entitled: "ADHESIVE COMPOSITION, ADHESIVE FILM COMPRISING THE SAME, METHOD OF PREPARING ADHESIVE FILM, AND DISPLAY MEMBER USING THE SAME," the disclosure of which is incorporated herein in its entirety by reference.

BACKGROUND

1. Field

Embodiments relate to an adhesive composition, an adhesive film including the same, a method of preparing the adhesive film, and a display member or optical member using the same.

2. Description of Related Art

A capacitive touchpad is bonded to a window or film via an optically transparent adhesive to detect variation in electrostatic capacity in the window or the film.

SUMMARY

Embodiments are directed to a display member including a display panel, a first adhesive film on the display panel, a transparent conductive layer on the first adhesive film, and a second adhesive film and a window on the second adhesive film. At least one of the first adhesive film and the second adhesive film includes a UV curable adhesive composition including a morpholine group-containing (meth)acrylic copolymer.

The UV curable adhesive composition may include the morpholine group-containing (meth)acrylic copolymer and a cross-linking agent.

The morpholine group-containing (meth)acrylic copolymer may be a copolymer of at least C1 to C20 alkyl (meth)acrylate, an alicyclic (meth)acrylate, a hydroxyl group-containing monomer, and an unsaturated morpholine. The unsaturated morpholine may be vinyl morpholine, acryloyl morpholine, or methacryloyl morpholine. The morpholine group-containing (meth)acrylic copolymer may be a copolymer of a monomer mixture including about 60 to 95 wt % of the C1 to C20 alkyl (meth)acrylate, about 0.5 to 20 wt % of the alicyclic (meth)acrylate, about 0.5 to 40 wt % of the hydroxyl group-containing monomer, and about 0.1 to 15 wt % of the unsaturated morpholine.

The morpholine group-containing (meth)acrylic copolymer may have a viscosity from about 1,000 to about 7,000 cP at 25° C.

The adhesive composition may have an acid value of 0.
The display panel may be an OLED panel.
The adhesive film may be optically transparent.
The adhesive film may have a thickness from about 50 μm to about 2 mm.
The display member may further include a polarizing plate between the first adhesive film and the display panel.

The display member may further include a polarizing plate between the second adhesive film and the transparent conductive layer.

The transparent conductive layer may include at least one of ITO (indium tin oxide), FTO (fluorinated tin oxide), AZO (aluminum doped zinc oxide), CNT (carbon nanotube), Ag nanowire, graphene, a metallic nanowire film and an organo-conductive film that contains conductive particles.

The at least one of the first adhesive film and the second adhesive film may include a morpholine group, an alicyclic group, and a hydroxyl group, wherein a sample structure including an ITO film and the adhesive film attached to the ITO film has a resistance variation (ΔR) of less than about 5%, as defined by Equation 1:

$$\Delta R = \frac{P_2 - P_1}{P_1} \times 100, \qquad \text{[Equation 1]}$$

where $P_2$ is a resistance of the sample structure after storage at 60° C./90% RH for 240 hours and $P_1$ is an initial resistance of the sample structure.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Example embodiments will now be described more fully hereinafter; however, they may be embodied in different forms and should not be construed as limited to the embodiments set forth herein. Rather, these embodiments are provided so that this disclosure will be thorough and complete, and will fully convey the scope thereof to those skilled in the art.

Unless otherwise specified in the specification, the term "(meth)acryl" collectively refers to both "acryl" and "methacryl."

An adhesive composition according to embodiments is UV-curable and includes a morpholine group-containing (meth)acrylic copolymer. In one embodiment, the adhesive composition includes the morpholine group-containing (meth)acrylic copolymer and a cross-linking agent. Hereinafter, each component of the adhesive composition according to embodiments will be described in detail.

(Meth)Acrylic Copolymer Having a Morpholine Group

In one embodiment, the (meth)acrylic copolymer may be a copolymer of a monomer mixture including a C1 to C20 alkyl (meth)acrylate, an alicyclic (meth)acrylate, a hydroxyl group-containing monomer, and an unsaturated morpholine.

Examples of the C1 to C20 alkyl (meth)acrylate may include methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, nonyl (meth)acrylate, decyl (meth)acrylate, dodecyl (meth)acrylate, lauryl (meth)acrylate ethylhexyl (meth)acrylate, etc. These (meth)acrylates may be used alone or in combination thereof. Here, "(meth)acrylate" collectively refers to both acrylates and methacrylates. The C1 to C20 alkyl (meth)acrylate may be present in an amount of about 60 to about 95 wt % in the (meth)acrylic copolymer. Within this range, the adhesive composition may not suffer from bubbles or separation under high-temperature and high-humidity conditions and may have excellent durability. In some implementations, the C1 to C20 alkyl (meth)acrylate may be present in an amount of about 65 to about 90 wt %, for example, about 70 to about 85 wt % in the (meth)acrylic copolymer.

Examples of the alicyclic (meth)acrylate may include isobornyl (meth)acrylate, bornyl (meth)acrylate, or cyclohexyl (meth)acrylate. These (meth)acrylates may be used alone or in combination thereof. The alicyclic (meth)acrylate may be present in an amount of 0.5 to 20 wt % in the (meth)acrylic copolymer. Within this range, the adhesive composition may secure excellent durability and initial adhesive strength. In some implementations, the alicyclic (meth)acrylate may be present in an amount of about 1 to about 15 wt %, for example, about 5 to about 12 wt % in the (meth)acrylic copolymer. In some embodiments, the alicyclic (meth)acrylate may be present in an amount of 3, 4, 5, 6, 7, 7.5, 8, 8.5, 9, 9.5, 10, 10.5, 11, 11.5, or 12 wt % in the (meth)acrylic copolymer.

Examples of the hydroxyl group-containing monomer may include 2-hydroxyethyl (meth)acrylate, 4-hydroxybutyl (meth)acrylate, 2-hydroxpropyl (meth)acrylate, 2-hydroxybutyl (meth)acrylate, 6-hydroxyhexyl (meth)acrylate, 1,4-cyclohexanedimethanol mono(meth)acrylate, chloro-2-hydroxypropyl (meth)acrylate, diethylene glycol mono(meth)acrylate, or allyl alcohol. Preferably, a C2 to C10 (meth)acrylate having one or two hydroxyl groups may be used. These hydroxyl group-containing monomers may be used alone or in combination thereof. The hydroxyl group-containing monomer may be present in an amount of about 0.5 to about 40 wt %, preferably about 1 to about 25 wt % in the (meth)acrylic copolymer. Within this range, the adhesive composition may have an increased adhesive strength and excellent durability, and the occurrence of bubbles under high-humidity conditions may be avoided. In some implementations, the hydroxyl group-containing monomer may be present in an amount of about 1 to about 20 wt %, for example, about 5 to about 18 wt % in the (meth)acrylic copolymer.

The unsaturated morpholine is a compound having an unsaturated group and a morpholine group. Examples of the unsaturated morpholine may include vinyl morpholine, acryloyl morpholine, and methacryloyl morpholine, without being limited thereto. These morpholines may be used alone or in combination thereof. The unsaturated morpholine is present in an amount of about 0.1 to about 15 wt %, preferably about 0.5 to about 10 wt %, and more preferably about 1 to about 5 wt % in the (meth)acrylic copolymer. Within this range, the adhesive composition can have excellent durability and initial adhesive strength. For example, the unsaturated morpholine may be present in an amount of 1, 2, 2.5, 3, 3.5 4, 4.5 5, 5.5 6, 6.5 7, 8, 9, or 10 wt % in the (meth)acrylic copolymer.

In one implementation, a weight ratio of the hydroxyl group-containing monomer to the unsaturated morpholine may be about 1.5:1 to 15:1, preferably about 5:1 to 12:1.

The (meth)acrylic copolymer may be polymerized by the addition of a copolymerizable monomer to the foregoing monomers. For example, a monomer having positive double refraction, such as aromatic (meth)acrylates, may be added for polymerization as desired.

The (meth)acrylic copolymer may be obtained via addition of an initiator to the monomers and then partial polymerization. Polymerization may be carried out until the (meth)acrylic copolymer becomes a viscous liquid having a viscosity from about 1,000 to about 7,000 cP at 25° C., preferably about 1,200 to about 4,000 cP, more preferably about 1,500 to about 3,500 cP. Within this range of viscosity, the adhesive composition may be easily applied and may have excellent workability.

The (meth)acrylic copolymer may have a weight average molecular weight ranging from about 500,000 to about 3,000,000 g/mol. Within this range, the adhesive composition may exhibit excellent adhesive strength or durability.

The (meth)acrylic copolymer may have a glass transition temperature (Tg) ranging from about −40° C. to about −5° C., preferably from about −30° C. to about −10° C. Within this range, the adhesive composition may exhibit excellent workability, durability, and adhesive strength.

The (meth)acrylic copolymer may be used for coating without being dissolved in a solvent. That is, the (meth)acrylic copolymer may be coated without a solvent, thereby simplifying a coating process and making it possible to form a thick adhesive film having a thickness ranging from about 50 µm to about 2 mm, for example, from about 100 µm to about 1.5 mm.

The initiator may be a photoinitiator. The photoinitiator may be activated by UV light or an electron beam to activate a carbon-carbon double bond in an adhesive film, causing radical reaction. Examples of the photoinitiator may include α-hydroxy ketones, a benzyl ketal compound, or a mixture thereof. Preferably, as α-hydroxy ketones, 1-hydroxy-cyclohexyl-phenyl-ketone, 2-hydroxy-2-methyl-1-phenyl-propanone, and 2-hydroxy-1-[4-(2-hydroxyethoxy)phenyl]-2-methyl-1-propanone may be used. These photoinitiators may be used alone or in combination thereof. The photoinitiator may be present in an amount of about 0.001 to about 3 parts by weight, preferably about 0.003 to about 1 part by weight, based on 100 parts by weight of the (meth)acrylic copolymer. Within this range, the adhesive composition may suppress light leakage while providing excellent durability.

Cross-Linking Agent

The morpholine group-containing (meth)acrylic copolymer may be mixed with a cross-linking agent.

As the cross-linking agent, a multifunctional (meth)acrylate that is curable by activation energy rays may be used.

Examples of the multifunctional (meth)acrylate may include bifunctional (meth)acrylates, such as 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, dicyclopentenyl di(meth)acrylate, caprolactone modified dicyclopentenyl di(meth)acrylate, ethyleneoxide modified di(meth)acrylate, di(meth)acryloxy ethyl isocyanurate, allylated cyclohexyl di(meth)acrylate, tricyclodecanedimethanol (meth)acrylate, dimethylol dicyclopentane di(meth)acrylate, ethyleneoxide modified hexahydrophthalic acid di(meth)acrylate, tricyclodecane dimethanol(meth)acrylate, neopentyl glycol modified trimethylpropane di(meth)acrylate, adamantane di(meth)acrylate or 9,9-bis[4-(2-acryloyloxyethoxy)phenyl]fluorene); trifunctional (meth)acrylates, such as trimethylolpropane tri(meth)acrylate, dipentaerythritol tri(meth)acrylate, propionic acid modified dipentaerythritol tri(meth)acrylate, pentaerythritol tri(meth)acrylate, propyleneoxide modified trimethylolpropane tri(meth)acrylate, trifunctional urethane (meth)acrylate or tris(meth)acryloxyethylisocyanurate; tetrafunctional (meth)acrylates, such as diglycerin tetra(meth)acrylate or pentaerythritol tetra(meth)acrylate; pentafunctional (meth)acrylates, such as dipentaerythritol penta(meth)acrylate; or hexafunctional (meth)acrylates, such as dipentaerythritol hexa(meth)acrylate, caprolactone modified dipentaerythritol hexa(meth)acrylate or urethane (meth)acrylate (e.g, reaction products of an isocyanate monomer and trimethylolpropane tri(meth)acrylate), without being limited thereto. These multifunctional (meth)acrylates may be used alone or in combination thereof.

In addition, a suitable isocyanate, epoxy, aziridine, melamine, amine, imide, carbodiimide or amide cross-linking agents or mixtures thereof may be used.

According to an implementation, the cross-linking agent may be present in an amount of about 0.01 to about 5 parts by weight, preferably about 0.03 to about 3 parts by weight, and more preferably about 0.05 to about 2 parts by weight based on 100 parts by weight of the morpholine group-containing (meth)acrylic copolymer.

The adhesive composition thus prepared may be formed without containing any acid component, such as (meth)acrylic acid, and thus may have an acid value of 0.

The adhesive composition may include suitable additives, for example, silane coupling agents, curing accelerators, an ionic liquid, lithium salt, inorganic fillers, softeners, antioxidants, anti-aging agents, stabilizers, tackifier resins, reforming resins, leveling agents, antifoaming agents, plasticizers, dyes, pigments, such as coloring and extender pigments, treatment agents, UV blocking agents, fluorescent whitening agents, dispersants, heat stabilizers, light stabilizers, UV absorbers, anti-static agents, lubricants, and solvents. As the reforming resin, polyol resins, phenolic resins, acrylic resins, polyester resins, polyolefin resins, epoxy resins, and epoxylated polybutadiene resins may be used.

An adhesive film according to embodiments may be formed by curing the adhesive composition. For example, the adhesive composition may be applied to a release film and UV-cured. In one embodiment, UV curing may be carried out at about 50 mw or less.

There is no particular restriction as to coating thickness, and an adhesive layer having a thickness from about 50 μm to about 2 mm, for example, from about 150 μm to about 1.5 mm, may be formed. Further, curing may be carried out in an oxygen blocking condition.

A sample structure including an ITO film and the adhesive film attached to the ITO film may exhibit a resistance variation (ΔR) of less than about 5%, as defined by Equation 1:

$$\Delta R = \frac{P_2 - P_1}{P_1} \times 100,$$ [Equation 1]

where $P_2$ is a resistance of the sample structure after storage at 60° C./90% RH for 240 hours and $P_1$ is an initial resistance of the sample structure.

In one embodiment, the adhesive film may have a peel strength value ranging from about 1,500 to about 3,000 gf/25 mm. The peel strength may be measured on a sample at 300 mm/min using a TA.XT Plus Texture Analyzer (manufactured by Stable Micro System). The sample may be prepared by attaching an adhesive film obtained using a PET film (backing film) having a thickness of 50 μm to an ITO film and leaving the attached adhesive film for 30 minutes.

Figure 1:
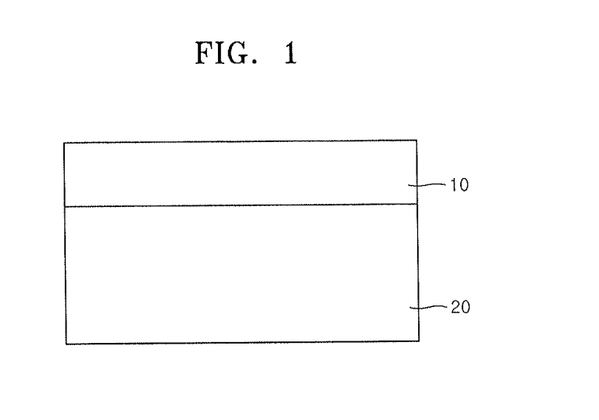
FIG. 1 is a schematic cross-sectional view illustrating a display member.

Embodiments may also provide a display member. The display member may include an optical film and the adhesive film attached to at least one side of the optical film. FIG. 1 is a schematic cross-sectional view illustrating a display member. The display member includes an optical film 20 and an adhesive film 10 formed of the adhesive composition on at least one surface of the optical film 20.

The optical film may be, for example, a polarizing plate, a color filter, a retardation film, an oval polarizing film, a reflective film, an anti-reflection film, a compensation film, a brightness enhancement film, an alignment film, a light diffusion film, a glass anti-scattering film, a surface protection film, a plastic LCD substrate, or an ITO film. The display member and/or optical film may include at least one of ITO (indium tin oxide), FTO (fluorinated tin oxide), AZO (aluminum doped zinc oxide), CNT (carbon nanotube), Ag nanowire and graphene. The optical film may be manufactured using a generally known method.

As an example of a display member, a touchpad may be attached to a window or optical film using the adhesive film, thereby forming a touch panel.

In another implementation, the adhesive film may be applied to a general polarizing film.

Figure 2:
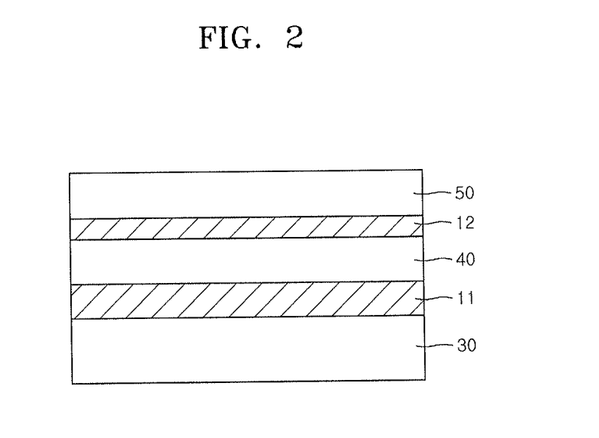
FIG. 2 is a schematic cross-sectional view illustrating a display member according to one embodiment.

FIG. 2 is a schematic cross-sectional view illustrating a display member according to an embodiment. The display member may include a display panel 30, a first adhesive film 11 on the display panel 30, a transparent conductive layer 40 on the first adhesive film 11, a second adhesive film 12, and a window 50 on the second adhesive film 12. At least one of the first adhesive film 11 and the second adhesive film 12 may be the adhesive film as described above.

The display panel 30 may be a LCD panel, LED panel or OLED panel. The OLED panel may include at least one organic layer between two electrodes. When the display panel 30 is an OLED panel, an encapsulation layer may be further included between the first adhesive film 11 and the OLED panel 30 to protect the OLED panel 30 from moisture and oxygen.

Further, a polarizing plate, for example, a circular polarizer, may be included between the first adhesive film 11 and the OLED panel 30 or between the second adhesive film 12 and the transparent conductive layer 40 to prevent the reflection of ambient light.

The transparent conductive layer 40 may include ITO (indium tin oxide), FTO (fluorinated tin oxide), AZO (aluminum doped zinc oxide), CNT (carbon nanotube), Ag nanowire, graphene, a metallic nanowire film or an organoconductive film that contains conductive particles, as examples. The transparent conductive layer 40 may have conductive patterns.

The window 50 may be glass or plastic film. In one implementation, the window 50 may be a flexible film.

Figure 3:
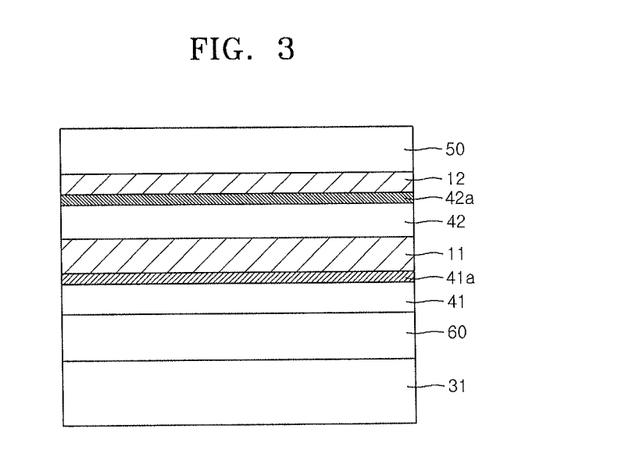
FIG. 3 is a schematic cross-sectional view illustrating a display member according to another embodiment.

FIG. 3 is a schematic cross-sectional view illustrating a display member according to another embodiment. The display member may include a LCD panel 31, an air gap 60 on the LCD panel 31, a first conductive layer 41 on the air gap 60, a first adhesive film 11 on the first conductive layer 41, a second conductive layer 42 on the first adhesive film 11, a second adhesive film 12, and a window 50 on the second adhesive film 12. A conductive pattern 41a, 42a may be formed on one side of the first and second conductive layer 41, 42 respectively to form electrodes such as sensing lines or driving lines. The sensing lines comprises a plurality of line units along the first direction (for example, X-axis direction) for detecting coordinates of touch input and along a second direction (for example, Y-axis direction) crossing with the first direction. The driving lines may form the capacitance with the sensing lines. In embodiment, the conductive layer 41, 42 may have a structure where conductive electrodes on the transparent substrate such as PET film. The material of the electrode is not particularly limited, but may include an ITO, an IZO, a conductive polymer, a metal, a metal oxide, and the like. The display member may include a first adhesive film 11 between the first and the second conductive layers 41, 42. At least one of the first adhesive film 11 and the second adhesive film 12 may be the adhesive film as described above.

Figure 4:
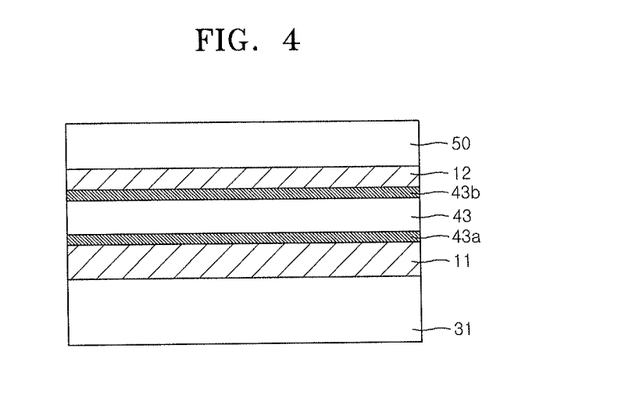
FIG. 4 is a schematic cross-sectional view illustrating a display member according to another embodiment.

FIG. 4 is a schematic cross-sectional view illustrating a display member according to another embodiment. The display member may include a LCD panel 31, a first adhesive film 11 on the LCD panel 31, a conductive layer 43 on the first adhesive film 11, a second adhesive film 12 on the conductive layer 43 and a window 50 on the second adhesive film 12. In the embodiment, conductive patterns 43a, 43b may be formed on both sides of the conductive layer 43. The conductive layer may be a glass substrate, such as ITO glass. The conductive patterns 43a, 42b may form sensing lines or driving lines. The sensing lines comprises a plurality of line units along the first direction (for example, X-axis direction) for detecting coordinates of touch input and along a second direction (for example, Y-axis direction) crossing with the first direction. The driving lines may form the capacitance with the sensing lines. At least one of the first adhesive film 11 and the second adhesive film 12 may be the adhesive film as described above.

Figure 5:
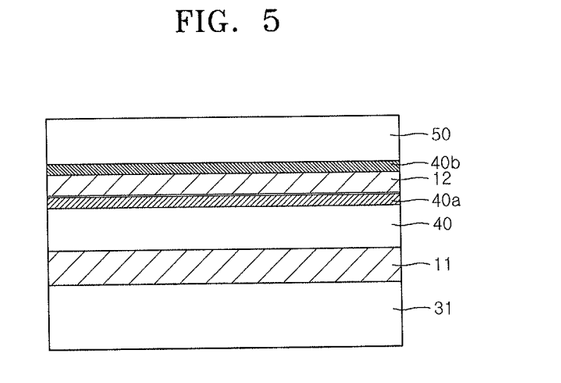
FIG. 5 is a schematic cross-sectional view illustrating a display member according to another embodiment.

FIG. 5 is a schematic cross-sectional view illustrating a display member according to another embodiment. The display member may include a LCD panel 31, a first adhesive film 11 on the LCD panel 31, a conductive layer 40 on the first adhesive film 11, a second adhesive film 12 on the conductive layer 40 and a window 50 on the second adhesive film 12. In the embodiment, a conductive pattern 40a may be formed on one side of the conductive layer 40 to form electrodes such as sensing lines or driving lines. Further, the display member may further include conductive patterns 40b on the window 50 to form electrodes such as sensing lines or driving lines. At least one of the first adhesive film 11 and the second adhesive film 12 may be the adhesive film as described above.

Figure 6:
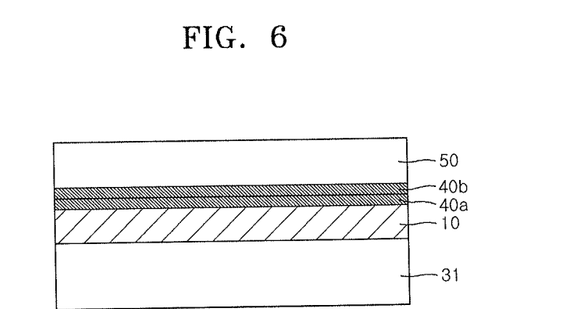
FIG. 6 is a schematic cross-sectional view illustrating a display member according to another embodiment.

FIG. 6 is a schematic cross-sectional view illustrating a display member according to another embodiment. The display member may include a LCD panel 31, an adhesive film 10 on the LCD panel 31, conductive layers 40a, 40b on the adhesive film 10, and a window 50. The conductive layers 40a, 40b may have a conductive pattern to form electrodes such as sensing lines or driving lines. An insulator or overcoat layer may be located between the conductive layers 40a, 40b. In the embodiment, the conductive pattern may be located directly on the window 50, and no glass or film substrate is needed between the window and the LCD panel. In this configuration, the display member may have excellent optical properties and be able to achieve a thinner and lighter form factor. The adhesive film 10 may be the adhesive film as described above.

Figure 7:
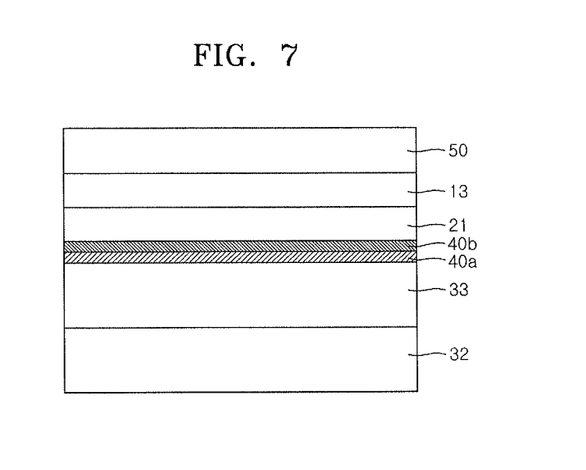
FIG. 7 is a schematic cross-sectional view illustrating a display member according to another embodiment.

FIG. 7 is a schematic cross-sectional view illustrating a display member according to another embodiment. The display member may include an OLED panel 32, an encapsulating layer 33 on the OLED panel 32, a first conductive layer 40a on the encapsulating layer 33, a second conductive layer 40b on the first conductive layer 40a, a circular polarizer 21 on the second conductive layer 40b, an adhesive layer 13 on the circular polarizer 21 and a window 50. The circular polarizer 21 may absorb a reflected light from the OLED panel 32. The conductive layers 40a, 40b may have a conductive pattern to form electrodes such as sensing lines or driving lines. An insulator or overcoat layer may be located between the conductive layers 40a, 40b. The adhesive layer 13 may be the adhesive composition as described above. In an embodiment, the adhesive layer 13 may be in the form of liquid state.

Figure 8:
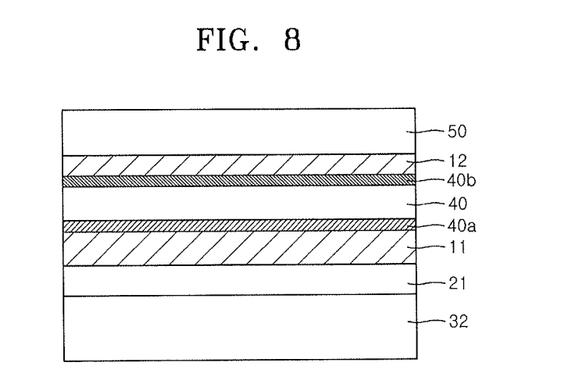
FIG. 8 is a schematic cross-sectional view illustrating a display member according to another embodiment.

FIG. 8 is a schematic cross-sectional view illustrating a display member according to another embodiment. The display member may include an OLED panel 32, a circular polarizer 21 on the OLED panel 32, a first adhesive film 11 on circular polarizer 21, a conductive layer 40 on the first adhesive film 11, a second adhesive film 12 on the conductive layer 40 and a window 50 on the second adhesive film 12. In the embodiment, conductive patterns 40a, 40b are formed on both sides of the conductive layer 40. The conductive patterns 40a, 40b may form sensing lines or driving lines. The sensing lines comprises a plurality of line units along the first direction (for example, X-axis direction) for detecting coordinates of touch input and along a second direction (for example, Y-axis direction) crossing with the first direction. The driving lines may form the capacitance with the sensing lines. At least one of the first adhesive film 11 and the second adhesive film 12 may be the adhesive film as described above.

Figure 9:
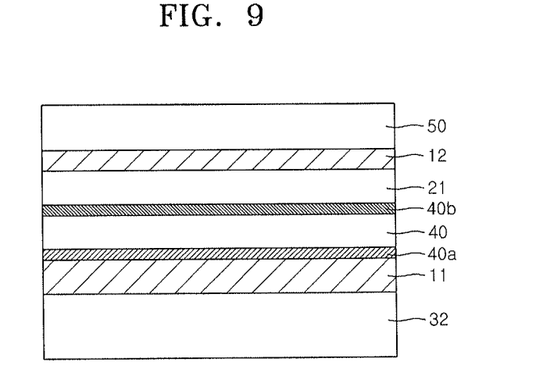
FIG. 9 is a schematic cross-sectional view illustrating a display member according to another embodiment.

FIG. 9 is a schematic cross-sectional view illustrating a display member according to another embodiment. The display member may include an OLED panel 32, a first adhesive film 11 on the an OLED panel 32, a conductive layer 40 on the first adhesive film 11, a circular polarizer 21 on the conductive layer 40, a second adhesive film 12 on the circular polarizer 21 and a window 50 on the second adhesive film 12. In the embodiment, conductive patterns 40a, 40b may be formed on both sides of the conductive layer 40. The conductive patterns 40a, 40b may form sensing lines or driving lines. The sensing lines comprises a plurality of line units along the first direction (for example, X-axis direction) for detecting coordinates of touch input and along a second direction (for example, Y-axis direction) crossing with the first direction. The driving lines may form the capacitance with the sensing lines. At least one of the first adhesive film 11 and the second adhesive film 12 may be the adhesive film as described above.

Figure 10:
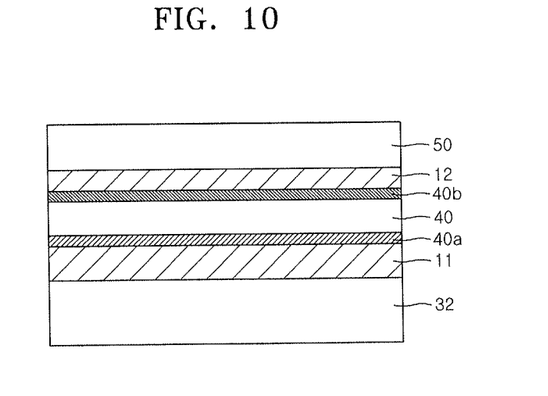
FIG. 10 is a schematic cross-sectional view illustrating a display member according to another embodiment.

FIG. 10 is a schematic cross-sectional view illustrating a display member according to another embodiment. The display member may include an OLED panel 32, a first adhesive film 11 on the an OLED panel 32, a conductive layer 40 on the first adhesive film 11, a second adhesive film 12 on the conductive layer 40 and a window 50 on the second adhesive film 12. In the embodiment, a circular polarizer is integral with the window 50. In the embodiment, conductive patterns 40a, 40b may be formed on both sides of the conductive layer 40. The conductive patterns 40a, 40b may form sensing lines or driving lines. The sensing lines comprises a plurality of line units along the first direction (for example, X-axis direction) for detecting coordinates of touch input and along a second direction (for example, Y-axis direction) crossing with the first direction. The driving lines may form the capacitance with the sensing lines. At least one of the first adhesive film 11 and the second adhesive film 12 may be the adhesive film as described above.

The following Examples and Comparative Examples are provided in order to highlight characteristics of one or more embodiments, but it is to be understood that the Examples and Comparative Examples are not to be construed as limiting the scope of the embodiments, nor are the Comparative Examples to be construed as being outside the scope of the embodiments. Further, it is to be understood that the embodiments are not limited to the particular details described in the Examples and Comparative Examples.

EXAMPLES

Example 1

62 parts by weight of ethylhexyl acrylate, 5 parts by weight of methyl acrylate, 15 parts by weight of isobornyl acrylate, 15 parts by weight of hydroxyethyl acrylate, 3 parts by weight of acryloyl morpholine, and 0.3 parts by weight of 2,2-dimethoxy-2-phenylacetophenone (Irgacure® 651, Ciba Japan K.K.) as a photoinitiator were mixed in a glass container. The mixture was polymerized by ultraviolet irradiation using a low-pressure lamp (Sylvania BL Lamp), thereby obtaining a (meth)acrylic copolymer having a viscosity of about 2,000 cP at 25° C. The (meth)acrylic copolymer was mixed with 0.2 parts by weight of 1,6-hexanediol diacrylate (HDDA) as a cross-linking agent and 0.3 parts by weight of a polymerization initiator (Irgacure® 651), thereby preparing an adhesive composition. The adhesive composition was applied to a polyester film having a thickness of 50 μm as a release film to form an adhesive film having a thickness of 175 μm. Opposite surfaces of the release film were subjected to irradiation for about 6 minutes using the low-pressure lamp (Sylvania BL Lamp), thereby producing a transparent adhesive film.

Example 2

An adhesive film was prepared in the same manner as in Example 1 except that 5 parts by weight of methyl acrylate was not added, and 63 parts by weight of ethylhexyl acrylate, 15 parts by weight of isobornyl acrylate, 20 parts by weight of hydroxyethyl acrylate, and 2 parts by weight of acryloyl morpholine were added.

Comparative Example 1

An adhesive film was prepared in the same manner as in Example 1 except that 65 parts by weight of ethylhexyl acrylate was added without adding acryloyl morpholine.

Comparative Example 2

An adhesive film was prepared in the same manner as in Example 1 except that acryloyl morpholine was not added and 2 parts by weight of acrylic acid was added.

TABLE 1

|  |  | Example 1 | Example 2 | Comparative Example 1 | Comparative Example 2 |
|---|---|---|---|---|---|
| Acrylic copolymer | EHA | 62 | 63 | 65 | 63 |
|  | MA | 5 | — | 5 | 5 |
|  | IBOA | 15 | 15 | 15 | 15 |
|  | HEA | 15 | 20 | 15 | 15 |
|  | ACMO | 3 | 2 | — | — |
|  | AA | — | — | — | 2 |
|  | Acrylamide | — | — | — | — |
| Viscosity of acrylic copolymer (cP) |  | 2000 | 2000 | 1800 | 2500 |
| Weight average molecular weight of acrylic copolymer |  | 2,500,000 | 2,500,000 | 2,500,000 | 2,500,000 |
| Cross-linking agent |  | 0.2 | 0.2 | 0.2 | 0.2 |
| Manufacturing method |  | UV curing | UV curing | UV curing | UV curing |
| Resistance variation (Δ %) |  | <2 | <2 | <2 | 7 |
| Peel strength |  | 1950 | 2030 | 1930 | 2200 |
| Durability |  | ○ | ○ | Δ | Δ |

\* Viscosity was evaluated at 25° C. and an rpm of 12 using a viscometer (LV-II).
\* Molecular weight was evaluated as to weight average molecular weight using GPC (Agilent).

Evaluation of Physical Properties (1) Resistance Variation

Each prepared adhesive film was attached to ITO PET and electrodes were formed on opposite sides using a silver paste, thereby preparing a sample. The initial resistance ($P_1$) of the sample was measured. The sample was left at 60° C./90% RH for 240 hours, followed by evaluation of the resistance ($P_2$). Here, the resistance was measured using a portable test instrument for measuring resistance, voltage, and current (Checkman, Tae Kwang Electronics Co.). To calculate the resistance variation (ΔR), the obtained resistances were substituted into Equation 1:

$$\Delta R = \frac{P_2 - P_1}{P_1} \times 100, \quad \text{[Equation 1]}$$

where $P_2$ is the resistance of the sample after storage at 60° C./90% RH for 240 hours and $P_1$ is the initial resistance of the sample.

(2) Peel Strength (gf/25 mm)

An adhesive film prepared using a PET film (backing film) having a thickness of 50 μm was attached to an ITO film and left for 30 minutes. Then, the peel strength of the sample was evaluated at 300 mm/min using TA.XT Plus Texture Analyzer (manufactured by Stable Micro Systems).

(3) Durability

A PC film/ITO film/glass and a PET film were bonded and left at 60° C./90% RH for 500 hours, followed by observation with the naked eye to identify whether separation, peeling, or bubbles occurred on an adherend. The samples were evaluated as follows.

○: No bubbles and no peeling—good
Δ: 1 to 5 bubbles or peelings—satisfactory
X: More than 5 bubbles or peelings)

As shown in Table 1, the adhesive films according to the Examples exhibited low resistance variation and excellent peel strength and durability, whereas the adhesive film of Comparative Example 1, in which acryloyl morpholine was not used, was shown to have worse durability. The adhesive film of Comparative Example 2, in which acrylic acid was added, was shown to exhibit a substantial increase in resistance variation.

By way of summation and review, a transparent adhesive may include an acrylic monomer and an acid, such as acrylic acid. Accordingly, when a general transparent adhesive is used on a touchpad, various types of acids present in the adhesive may oxidize indium tin oxide (ITO) on the touchpad, causing increase in resistance of the ITO and thus deteriorating characteristics of the touchpad. Moreover, a window or film formed of glass, PMMA or PC may suffer from separation, bubble generation, curling, or exposure of an ITO pattern depending on its materials upon environmental variation.

Therefore, it is desirable for an adhesive for a touchscreen to not only exhibit excellent durability and cuttability, but to also be capable of effectively suppressing variation in resistance of an electrode layer under severe conditions.

Embodiments may provide an adhesive composition that has excellent durability and cuttability, minimizes corrosion of ITO, is capable of effectively suppressing resistance variation of an electrode layer under severe conditions, does not cause separation of an end portion, bubbles, curling and light leakage, can be easily coated without a solvent, and facilitates formation of a thick film. Embodiments are also directed to an adhesive film formed by curing the adhesive composition. The adhesive film may have satisfactory durability and may be acid-free.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A display member, comprising:
a display panel,
a first adhesive film on the display panel,
a transparent conductive layer on the first adhesive film, and
a second adhesive film and a window on the second adhesive film,
wherein at least one of the first adhesive film and the second adhesive film includes a UV curable adhesive composition including a morpholine group-containing (meth)acrylic copolymer that is a copolymer of at least a C1 to C20 alkyl (meth)acrylate, an alicyclic (meth)acrylate, a hydroxyl group-containing monomer, and an unsaturated morpholine, wherein a weight ratio of the hydroxyl group-containing monomer to the unsaturated morpholine is about 1.5:1 to 15:1, wherein the adhesive composition has an acid value of 0, and further wherein a sample structure including an ITO film and one of the first adhesive film and the second adhesive film that includes the UV curable adhesive composition attached to the ITO film has a resistance variation (ΔR) of less than about 5%, as defined by Equation 1:

$$\Delta R = \frac{P_2 - P_1}{P_1} \times 100,$$ [Equation 1]

where $P_2$ is a resistance of the sample structure after storage at 60° C./90% RH for 240 hours and $P_1$ is an initial resistance of the sample structure.

2. The display member as claimed in claim 1, wherein the UV curable adhesive composition includes the morpholine group-containing (meth)acrylic copolymer and a cross-linking agent.

3. The display member as claimed in claim 1, wherein the unsaturated morpholine includes at least one selected from the group of vinyl morpholine, acryloyl morpholine, and methacryloyl morpholine.

4. The display member as claimed in claim 1, wherein the morpholine group-containing (meth)acrylic copolymer includes a copolymer of a monomer mixture including about 60 to 95 wt % of a C1 to C20 alkyl (meth)acrylate, about 0.5 to 20 wt % of an alicyclic (meth)acrylate, about 0.5 to 40 wt % of a hydroxyl group-containing monomer, and about 0.1 to 15 wt % of an unsaturated morpholine.

5. The display member as claimed in claim 1, wherein the morpholine group-containing (meth)acrylic copolymer has a viscosity from about 1,000 to about 7,000 cP at 25° C.

6. The display member as claimed in claim 1, wherein the display panel is OLED panel.

7. The display member as claimed in claim 1, wherein the adhesive film that includes the adhesion composition is optically transparent.

8. The display member as claimed in claim 1, wherein the adhesive film that includes the adhesive composition has a thickness from about 50 nm to about 2 mm.

9. The display member as claimed in claim 1, wherein the display member further includes a polarizing plate between the first adhesive film and the display panel.

10. The display member as claimed in claim 1, wherein the display member further includes a polarizing plate between the second adhesive film and the transparent conductive layer.

11. The display member as claimed in claim 1, wherein the transparent conductive layer includes at least one of ITO (indium tin oxide), FTO (fluorinated tin oxide), AZO (aluminum doped zinc oxide), CNT (carbon nanotube), an Ag nanowire, graphene, a metallic nanowire film and an organoconductive film that contains conductive particles.

12. The display member as claimed in claim 1, wherein the copolymer is formed by polymerization of the at least a C1 to C20 alkyl (meth)acrylate, an alicyclic (meth)acrylate, a hydroxyl group-containing monomer, and an unsaturated morpholine, wherein the polymerization is performed in the absence of a solvent that does not form a part of the copolymer.

* * * * *